United States Patent [19]
Uehara

[11] 4,358,804
[45] Nov. 9, 1982

[54] CONTROLLABLE DRIVE FOR TAPE RECORDER

[75] Inventor: Zenshiro Uehara, Tokyo, Japan

[73] Assignee: Tokyo Rokuon Kogyo Kabushiki Kaisha, Tokyo, Japan

[21] Appl. No.: 134,537

[22] Filed: Mar. 27, 1980

[51] Int. Cl.$^3$ .................. G11B 5/54; G11B 21/22; G11B 15/30
[52] U.S. Cl. .................................. 360/105; 360/96.4
[58] Field of Search .................. 360/137, 105, 96.1, 360/96.3, 96.4, 106

[56] References Cited

U.S. PATENT DOCUMENTS

| | | | |
|---|---|---|---|
| 3,921,216 | 11/1975 | Wada | 360/106 |
| 4,041,539 | 8/1977 | Robarge | 360/106 |
| 4,149,203 | 4/1979 | Kobayashi et al. | 360/96.1 |
| 4,170,789 | 10/1979 | Inoue | 360/137 |
| 4,172,266 | 10/1979 | Onishi et al. | 360/137 |

*Primary Examiner*—Robert S. Tupper

[57] ABSTRACT

A controllable drive for a tape recorder including a toothed wheel having first and second toothed portions, first and second hiatus portions and a cam surface. The toothed portions are arranged to engage a drive gear, whereas the hiatus portions do not engage the drive gear. A link is disposed for angular movement and is driven by the cam surface. A spring urges the link against the cam. A locking mechanism is provided to lock the toothed wheel in a first position whereat one of the hiatus portions is adjacent to the drive wheel and a second position whereat the other hiatus portion is adjacent the drive wheel. When unlocked from its second position, the link, under action of the spring, urges the toothed wheel in a first direction until the first toothed portion engages the drive wheel. Thereafter, the drive gear drives the toothed wheel until the first position is reached whereat the drive wheel is again locked. The cam surface is shaped such that after the drive gear engages the first toothed portion, the cam surface angularly moves the link against the action of the spring. The hiatus portion associated with the first position is sufficiently wide such that upon being unlocked from the first position, the wheel freely rotates a major portion of the distance to the second position until the second toothed portion engages the drive gear and provides a breaking action to the free rotation. The free rotation occurs in response to the link acting against the cam surface under the urging of the spring. As the wheel is slowed by the second toothed portion, it is rotated in response to rotation of the drive gear to the hiatus associated with the aforementioned first position.

5 Claims, 10 Drawing Figures

CONTROLLABLE DRIVE FOR TAPE RECORDER

BACKGROUND OF THE INVENTION

The invention relates to a controllable drive for tape recorder which utilizes the rotating motion of a flywheel associated with a capstan to enable a record, playback, rewind and other operation.

In the prior art practice, when a tape recorder of a cassette type or open reel type is to be designed so as to achieve an automation of a record, playback, stop, rewind or other operation, an electromagnetic plunger is used as a drive source to permit a "feather-touch" operation or a remote control. When a record/playback mode of the tape recorder is to be established, it is necessary to slide a head mount on which various heads, pinch roller and the like are mounted, to a record/playback position against the action of a return spring or the like and to urge the pinch roller against the capstan with a force of a magnitude which is usually on the order of 1 to 2 kg. While the magnitude of the force varies with the variety and the size of the tape recorders, a required minimum value for apparatus of a reduced size will be on the order of 1 kg. The electromagnetic plunger which is used to produce such force will be oversized as compared with that of the heads, occupying a greater proportion of the space on the chassis. In addition, the power dissipation is increased, which is disadvantageous from the standpoint of minimizing the overall power consumption. In addition, the use of the electromagnetic plunger causes impacts and noises when it is energized, further contributing to the generation of heat. The situation is not limited to the operation of the plunger which is used to establish a record/playback mode, but the same applies to the operation of another electromagnetic plunger which is used to establish a rewind or rapid advance mode.

SUMMARY OF THE INVENTION

In view of these considerations, it is an object of the invention to provide a controllable drive for tape recorder which utilizes the rotating motion of a flywheel associated with a capstan by converting it into a form of motion which is necessary to establish a record/playback or rewind mode, by utilizing gears, cams and links which are thereafter unlocked to terminate a selected mode without while avoiding the use of the rotating energy of the flywheel, thus permitting a rapid, self-powered resetting of the tape recorder.

DESCRIPTION OF PREFERRED EMBODIMENT

Figure 1:
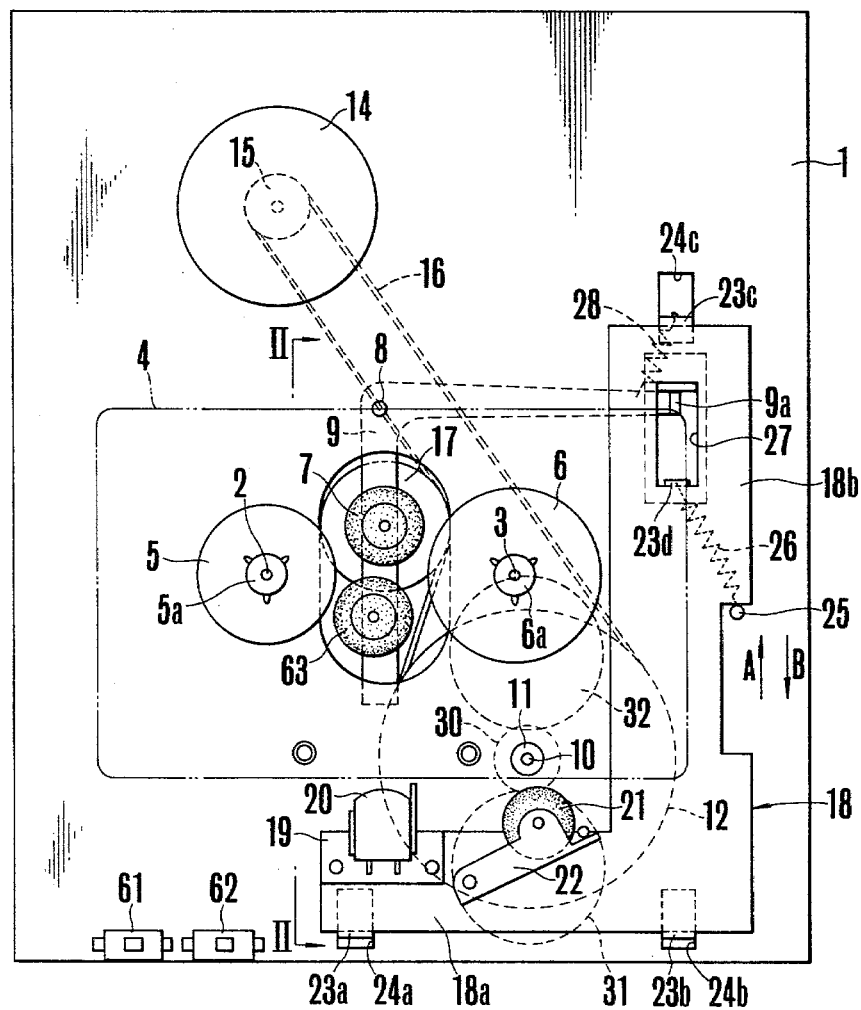
FIG. 1 is a plan view of the mechanical arrangement of a tape recorder incorporating the controllable drive of the invention.

FIG. 1 is a plan view of the mechanical arrangement of a tape recorder which incorporates the controllable drive of the invention. Mounted on a chassis 1 are a pair of shafts 2, 3 in an upright manner, which are spaced by a distance corresponding to the on-center spacing between a pair of reel hubs on which a tape cassette 4 is disposed. A feed reel mount 5 is rotatably mounted on the shaft 2 while a take-up reel mount 6 is rotatably mounted on the shaft 3. The respective reel mounts 5, 6 are integrally formed with concentric shanks 5a, 6a, which are engaged by the respective reel hubs.

A first idler 7 is disposed between the reel mounts 5, 6 for engagement with and disengagement from the outer periphery of the reel mount 6. The idler 7 is rotatably mounted on one end of an L-shaped lever 9 which is in turn pivotally mounted on the underside of the chassis 1 by means of pin 8. A second idler 63 is rotatably mounted on the same end of the lever 9 for engagement with and disengagement from the outer periphery of the first idler 7 and the reel mount 5.

Figure 2:
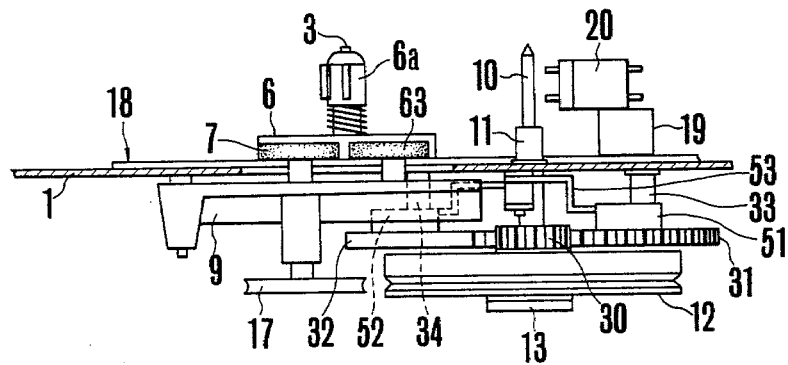
FIG. 2 is a cross section taken along the line II—II shown in FIG. 1.

A capstan 10 extends uprightly through the chassis 1 and is rotatably mounted therein by means of a bearing 11, and fixedly mounted on the portion of the capstan which extends below the chassis 1 is a flywheel 12 which serves stabilizing the rotation of the capstan 10 by absorbing small speed fluctuations caused by a non-uniform rotation of a motor and a transmission mechanism. The lower end of the capstan 10 is supported by a bracket 13, which is mounted on the underside of the chassis 1, in order to prevent the capstan from being withdrawn from the bearing 11 (see FIG. 2). A drive motor 14 is mounted on the chassis 1 and has its shaft extending below the chassis and fixedly carrying a pulley 15 below the latter. A belt 16 extends around the pulley 15 and the flywheel 12, thus transmitting the rotation of the motor 14 to the capstan 10. Intermediate the pulley 15 and the flywheel 12, the belt 16 also extends around a pulley 17 which is integrally mounted on the shaft on which the first idler 7 is mounted, thus transmitting the rotation of the motor 14 to the first idler 7 also.

A head mounting baseplate 18 is disposed on top of the chassis 1 and is movable in directions indicated by arrows A, B. As will be noted from FIG. 1, the baseplate 18 has an inverted L-shaped configuration and includes a front arm 18a on which a record/playback head 20 is mounted by using a head mount 19 and on which a pinch roller 21 formed of rubber is also mounted by using a support 22 in a manner to permit its cooperation with the capstan 10. The front edge of the arm 18a is formed with a pair of spaced claws 23a, 23b which are engaged with elongate slots 24a, 24b formed in the chassis 1. Similarly, a claw 23c is formed on the rear edge of a lateral arm 18b of the baseplate 18, and engages a similar elongate slot 24c formed in the chassis. In this manner, the entire baseplate 18 is slidable in directions indicated by arrows A, B. A stop 25 is provided on the chassis 1 to limit the extent of movement of the baseplate 18 in the direction of arrow B, and a tension spring 26 extends between the stop 25 and a claw 23d formed on the baseplate 18 beneath the chassis to urge the baseplate 18 in the direction of arrow B to enable a self-powered return of the head assembly to its reset position. The other end 9a of the lever 9 which is remote from the idlers 7, 63 is engaged with a slot 27 formed in the lateral arm 18b so that the level 9 can be turned either forwardly or reversely around the pin 8 as the baseplate 18 moves in the directions of arrows A, B, thereby moving the first idler into engagement with or disengagement from the outer periphery of the take-up reel mount 6. Another tension spring 28 extends between the end 9a of the lever 9 and the claw 23c of the baseplate 18.

Figure 3:
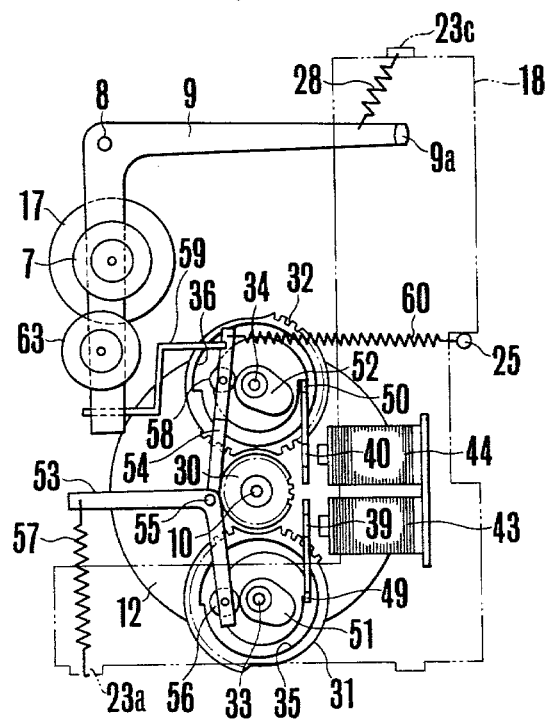
FIG. 3 is a plan view of the controllable drive of the invention, with the chassis and the head mounting baseplate removed.
Figure 4:
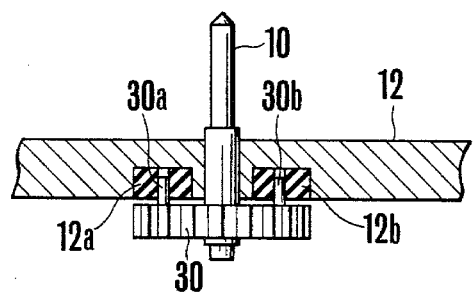
FIG. 4 is a cross section, illustrating the mounting of a flywheel and a drive gear.

FIG. 3 is a plan view of the controllable drive located below the chassis 1 and the baseplate 18, both of which are omitted from illustration. In this Figure, the drive comprises a drive gear 30 which is located on the upper surface of and is integral and concentric with the flywheel 12. As shown in FIG. 4, a pair of pins 30a, 30b are fixedly mounted on the surface of the gear 30 which faces the flywheel, and a pair of rubber bushings 12a, 12b are embedded in the corresponding surface of the flywheel 12 and fitted over the pins 30a, 30b, thus securely mounting the gear 30 on the flywheel 12.

Figure 5:
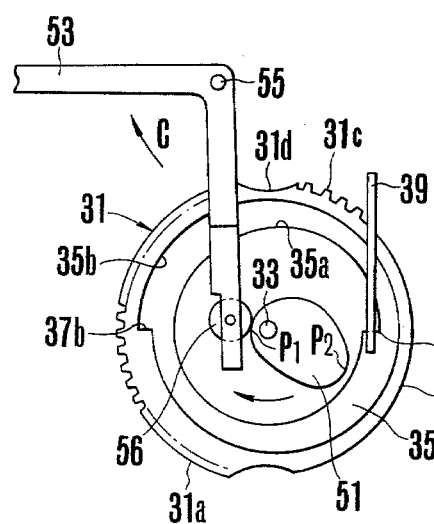
FIG. 5 is a plan view of part of a toothed wheel which is used in establishing a record/playback mode according to the invention.
Figure 6:
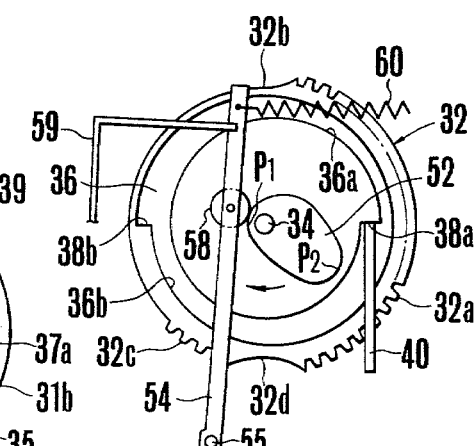
FIG. 6 is a plan view of part of another toothed wheel which is used to establish a rewind mode according to the invention.

A toothed wheel 31 which is utilized during a record/playback mode and another toothed wheel 32 which is utilized during a tape rewind mode are disposed on the opposite sides of the drive gear 30 for meshing engagement therewith. These toothed wheels 31, 32 are rotatably mounted on upright shafts 33, 34 which are mounted on the underside of the chassis 1. As shown in FIG. 5, the toothed wheel 31 includes a toothed portion 31a which rotates by meshing engagement with the drive gear 30 to move the head assembly or the entire head mounting baseplate 18 to its record/playback position, a hiatus 31b which is contiguous with the toothed portion 31a and located to avoid an interference with a rapid, self-powered returning movement of the head assembly under the resilient of the spring 26, another toothed portion 31c which continues to the hiatus 31b and applies a breaking action to the rapid, self-powered returning movement of the head assembly, and another hiatus 31d which is located intermediate the toothed portions 31c, 31a. As shown in FIG. 6, the toothed wheel 32 is constructed similarly as the toothed wheel 31, and includes a toothed portion 32a which rotates by meshing engagement with the drive gear 30 to move the lever 9 to its rewind position, a hiatus 32b which continues to the toothed portion 32a and located to avoid an interference with a rapid, self-powered returning movement of the lever 9 under the action of the spring 28, another toothed portion 32c which continues to the hiatus 32b and applies a breaking action to the rapid, self-powered returning movement of the lever 9, and another hiatus 32d which is located intermediate the toothed portions 32c and 32a. In the surface facing the chassis, the both toothed wheels 31, 32 are formed with substantially concentric, continuous grooves 35, 36, respectively. As shown in FIG. 5, a pair of locking steps 37a, 37b are formed on the inner and the outer wall surface 35a, 35b, respectively, of the groove 35 and are displaced 180° from each other and are displaced 90° from the hiatus 31d. Similarly, as shown in FIG. 6, a pair of locking steps 38a, 38b are formed in the inner and the outer wall surface 36a, 36b of the groove 36, and are displaced 180° from each other and are displaced 90° from the hiatus 32d. It should be noted that the inner and the outer wall surfaces of the respective grooves 35, 36 are in the form of an involute starting from the associated step.

Figure 7:
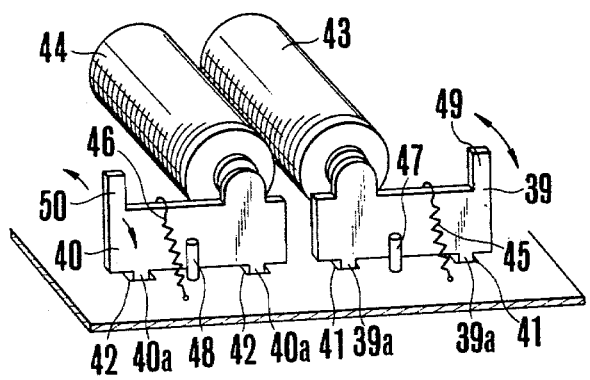
FIG. 7 is a perspective view of movable elements and electromagnets used in the invention.

Referring to FIG. 3, a pair of movable elements 39, 40 in the form of plates are associated with the toothed wheels 31, 32, respectively, and are disposed tangentially of the grooves 35, 36 of the associated wheels 31, 32. As shown in FIG. 7, along its edge which bears against the chassis, the movable element 39 is formed with a plurality of tabs 39a, which are engaged with apertures 41 formed in the chassis 1. Similarly, the movable element 40 is formed with a plurality of tabs 40a along the edge engaging the chassis, which tabs are engaged with apertures 42 formed in the chassis 1. In this manner, the movable elements 39, 40 are tiltable with respect to the chassis 1. A pair of electromagnets 43, 44 are mounted on the chassis 1 for attracting individual movable elements 39, 40 separately. A pair of springs 45, 46 extend between the movable elements 39, 40 and the chassis 1 to urge these elements in a direction away from their associated electromagnets. A pair of stops 47, 48 are shown which limit the angle of inclination of the movable elements 39, 40 in a direction away from the corresponding electromagnets. In the region adjacent to the toothed wheels, the movable elements 39, 40 are formed with projections 49, 50, respectively, which are disposed within the respective grooves 35, 36. When the elements are attracted by the associated electromagnets, the projections 49, 50 bear against the outer wall surfaces 35b, 36b of the grooves 35, 36, respectively, so as to be engaged by the steps 37b, 38b, respectively, while they are engaged by the steps 37a, 38a, respectively, when the elements 39, 40 are urged by the springs into abutment against the stops 47, 48 so as to bear against the inner wall surfaces 35a, 36a of the grooves 35, 36, respectively.

Integrally secured to the surface of the toothed wheels 31, 32 in which the grooves are formed are a pair of plate cams 51, 52 which are disposed in an offset manner and are associated with a pair of links 53, 54, separately, both of which are adapted to be angularly driven thereby. The link 53 associated with the plate cam 51 is substantially L-shaped in configuration with the bend being pivotally mounted on the underside of the chassis 1 by means of a pin 55. A cam follower 56 is mounted on one arm of the link 53 and is urged against the cam profile of the cam 51 by a tension spring 57 having a greater resilience than that of the baseplate return spring 26 and extending between the other end of the link 53 and the claw 23a on the baseplate 18. When the follower is held against the cam 51, the selection of a record/playback mode of the head assembly as well as its release operation can be achieved by the rotation of the plate cam 51. The link 54 associated with the other plate cam 52 is pivotally mounted, at its one end, on the same pin 55 on which the link 53 is pivotally mounted, and fixedly carries a cam follower 58 which is urged against the cam profile of the plate cam 52 by a tension spring 60 extending between the other end of the link 54 and the stop 25. The other end of the link 54 is connected with one end of the idler lever 9 through a rod 59 which functions as a spring. When the follower 58 is held against the cam 52, a tape rewind operation and its release operation can be achieved through the rotation of the plate cam 52. A pair of switches 61, 62 (see FIG. 1) operate to energize the electromagnets 43, 44, respectively.

The operation of the controllable drive according to the invention will be described below. Initially, it is assumed that a record/playback mode of the tape recorder is to be established under the conditions that the tape hubs carrying the tape cassette 4 are mounted on the reel mounts 5, 6 and the motor 14 is set in motion. When the head assembly including the head 20, pinch roller 21 and baseplate 18 assumes a non-play position shown in FIG. 1, the projection 49 on the movable element 39 is engaged with the inner step 37a formed in the groove 35 under the resilience of the spring 45 to thereby lock the toothed wheel 31 (see FIG. 5), with its hiatus 31d located adjacent gear 30, which is rotating integrally with the flywheel 12. In addition, the cam follower 56 engages the plate cam 51 at a position shown in FIG. 5 in which it has slightly moved past a short diameter apex $P_1$.

When the switch 61 is turned on under this condition, the electromagnet 43 is energized to attract the movable element 39 against the resilience of the spring 45. This disengages the projection 49 from the step 37a and brings it into engagement with the outer wall surface 35b. Simultaneously, the toothed wheel 31 is unlocked, and the pressure exerted by the cam follower 56 which engages the cam at a position where it has moved past the apex $P_1$ causes the plate cam 51 and the toothed wheel 31 to be slightly rotated in a direction indicated by an arrow in FIG. 5. This displaces the relative position of the hiatus 31d with respect to the gear 30, and the toothed portion 31a of the wheel 31 is brought into meshing engagement with the gear 30. Thereupon, the rotation of the gear 30 is transmitted to the wheel 31 and the plate cam 51, which therefore rotates in the direction of the arrow (see FIG. 5) to cause the link 53 to rock in the direction of an arrow C about the pin 55 through the action of the cam follower 56. As a result, the baseplate 18 slides in the direction of the arrow A shown in FIG. 1 against the resilience of the spring 26, by virtue of the rotating energy stored in the flywheel 12 and the drive from the motor 14. In this manner, the head 20 is brought into abutment against the cassette tape, and simultaneously the pinch roller 21 is brought into abutment against the capstan 10 with a given pressure, thus operating to feed the tape. As the baseplate 18 slides, the lever 9 connected therewith angularly moves counter-clockwise, as viewed in FIG. 1, under the resilience of the spring 28, bringing the first idler 7 into abutment against the take-up reel mount 6 to transmit its rotation thereto, thus causing the tape to be taken up on the corresponding reel hub as it is fed from the supply reel.

Figure 8:
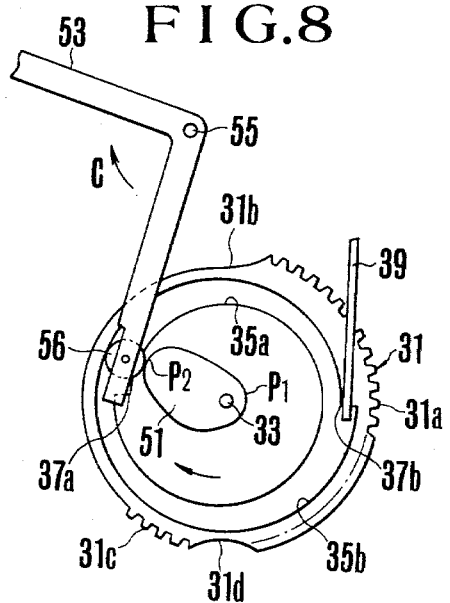
FIGS. 8 and 9 are plan views illustrating the operation of the invention.

On the other hand, when the head assembly assumes its record/playback position and the toothed wheel 31 has rotated through 180° to place its hiatus 31b adjacent gear 30, the projection 49 on the movable element 39 which is attracted by the action of electromagnet 43 will engage the outer step 37b, thus locking the toothed wheel 31. At this time, the cam follower 56 engages the plate cam 51 at a position shown in FIG. 8 in which it has slightly moved past a greater diameter apex $P_2$.

Figure 10:
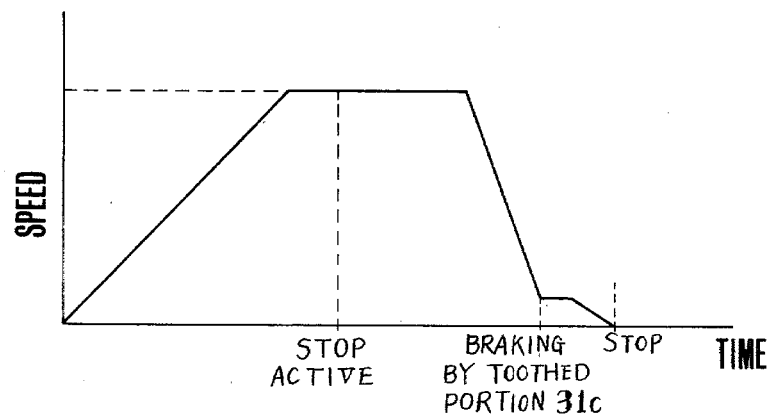
FIG. 10 graphically illustrates the operation of the head mounting baseplate.

The selected operating of the tape recorder can be terminated or released by turning off the switch 61, whereupon the electromagnet 43 is deenergized to disengage the projection 49 from the step 37b. Simultaneously, the pressure exerted by the cam follower 56 against the plate cam 51, at a point where it has moved past the apex $P_2$, causes it and hence the toothed wheel 31 to rotate straightforward or unobstructed in the direction of the arrow shown in FIG. 8, since the hiatus 31b is located opposite to the gear 30. Consequently, as indicated by the speed response of FIG. 10, the entire head mounting baseplate 18 is rapidly returned in the direction of the arrow B shown in FIG. 1 by the resilience of the spring 26 at a rate higher than that which prevails during a record/playback operation and independently from the rotation of the flywheel 12, until the toothed portion 31c of the toothed wheel 31 bears against the gear 30, whereupon the rate of the self-powered returning movement is rapidly braked. The resulting shocks are absorbed by the gear 30 and also by the rubber bushings 12a, 12b. If the flywheel 12 continues to rotate subsequently, the toothed wheel 31 which has its toothed portion 31c meshed with the drive gear 30 rotating integrally with the flywheel 12 will rotate gently to a stop position where the gear 30 is opposed by the hiatus 31d of the toothed wheel 31, whereupon the head mounting baseplate 18 is brought to a stop completely, thus returning to the condition shown in FIG. 1. At this time, the projection 49 on the movable element 39 again engages the inner step 37a of the groove 35, as shown in FIG. 5, locking the toothed wheel 31. If the flywheel 12 remains stationary for reasons such as a power failure, the toothed portion 31c of the toothed wheel 31 will be maintained in bearing relationship with the gear 30.

Considering now a tape rewind operation of the tape recorder, the switch 62 may be turned on to energize the electromagnet 44. Thereupon, the movable element 40 is attracted against the resilience of the spring 46, with its projection 50 disengaged from the inner step 38a, unlocking the toothed wheel 32. Simultaneously, since the cam follower 58 engages the cam 52 at a position shown in FIG. 6 in which it has slightly moved past the short diameter apex $P_1$, the plate cam 52 and the toothed wheel 32 are caused to rotate slightly in the direction of the arrow shown in FIG. 6, generally in the similar manner as when establishing the playback and/or record mode. In this manner, the wheel 32 is brought into meshing engagement with the rotating gear 30. The resulting rotation of the toothed wheel 32 causes the plate cam to rotate in the direction of the arrow shown in FIG. 6, causing the link 54 to move counter-clockwise, as viewed in FIG. 3, whereby the lever 9 which is connected therewith through the rod 59 moves clockwise, as viewed in FIG. 3, bringing the second idler 63 into abutment against both the feed reel mount 5 and the first idler 7. The rotation of the first idler 7 is thereby transmitted through the second idler 63 to the feed reel mount 5, achieving a rewind of the tape from the reel hub which is disposed on the take-up reel mount.

When the tape rewind mode is established, as the toothed wheel 32 rotates through 180° to place the hiatus 32b adjacent gear 30, the projection 50 on the movable element 40 which is attracted by the action of electromagnet 44 engages the outer step 38b, locking the toothed wheel 32.

Figure 9:
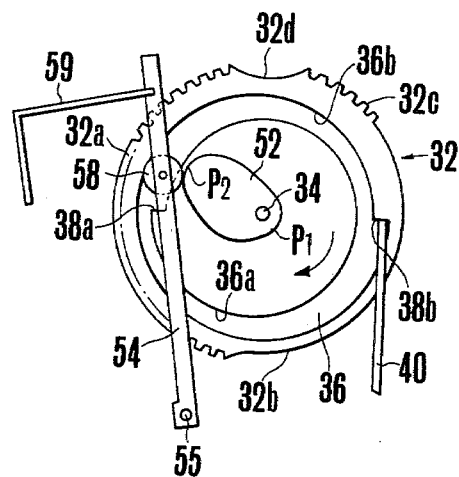

The tape rewind mode can be released or terminated by turning the switch 62 off. Thereupon, the electromagnet 44 is deenergized to disengage the projection 50 from the step 38b, and the pressure exerted upon the cam by the cam follower 58 which engages the latter at a point where it has moved past the greater diameter apex $P_2$ as shown in FIG. 9 causes the plate cam 52 and the toothed wheel 32 to rotate straightforward in the direction of the arrow shown in FIG. 9, since the gear 30 is adjacent hiatus 32b. Hence the lever 9 which is connected to the link 54 is rapidly returned by the resilience of the spring 28 at a rate greater than that of the rewind operation (a rapid self-powered returning movement) until the toothed portion 32c of the toothed wheel 32 bears against the gear 30, whereupon the returning movement is rapidly braked. The resulting shocks are absorbed by the rubber bushings 12a, 12b. The subsequent rotation of the flywheel 12 causes a gentle rotation of the toothed wheel 32 while its toothed portion 32c meshes with the drive gear 30, and also causes a gentle rotation of the lever 9 to its stop position simultaneously. When the hiatus 32d of the toothed wheel 32 comes opposite to the gear 30, the lever 9 comes to a stop completely, returning to the condition shown in FIG. 1. At this time, the projection 50 on the movable element 40 is again engaged with the inner step 38a as shown in FIG. 6, locking the toothed wheel 32.

In addition to the record/playback and rewind operation of the tape recorder as illustrated in the above embodiment, the invention is equally applicable to the use of a rapid tape advance operation. In this instance, a toothed wheel which meshes the gear 30, a plate cam, a movable element and an electromagnet may be additionally provided in the same manner as these components are provided to achieve a record/playback operation. It is also possible to employ a purely mechanical operation in place of the use of the electromagnet in order to operate the movable element to lock, unlock or position the toothed wheel. It should also be noted that detent means which is provided on the toothed wheel in order to lock the movable element is not limited to a step, which may be replaced by a pin or any other member.

As discussed above, in the apparatus of the invention, the rotating motion of the flywheel associated with the capstan is converted into a form of motion which is required to establish a record/playback or rewind mode of the tape recorder, by using the combination of the gear which rotates integrally with a flywheel, a toothed wheel or wheels with hiatus which are adapted to mesh with the gear, and their integral cams, and links which are angularly driven by the cams. This avoids the provision of an electromagnetic plunger of an increased capacity as required in the prior art, allowing a substantial reduction in the power dissipation of the tape recorder. Even though the electromagnets are used, the power dissipation is nevertheless less than one-tenth the value of the prior art. Furthermore, the tape recorder can be reduced in size, and the occurrence of percussion sounds when operating the mechanical arrangement of the tape recorder can be reduced. Since the toothed wheel which is used to establish a record, playback or rewind mode is provided with a hiatus which does not mesh with the drive gear 30 and which becomes effective when a selected mode is to be terminated, a rapid, self-powered returning movement of the tape recorder is enabled. Consequently, the invention can be applied to a tape recorder of a miniature size employing a small flywheel which rotates at a reduced rate. The automatic resetting is also enabled during a power failure. Since the self-powered returning movement takes place in two states, an abrasion of the locking steps on the toothed wheels 31, 32 and their associated movable elements can be reduced improving their useful life. In addition, the locking mechanism can be simplified, allowing an electromagnetic plunger of a reduced capacity to be used.

What is claimed is:

1. A controllable drive assembly for a tape recorder having a chassis, a tape head and a base plate movable on said chassis for moving said tape head, said drive assembly comprising: a drive gear; a motor for driving the drive gear; a toothed wheel which is mounted for rotation and including a first and second toothed portion and a first and second hiatus portion, the toothed portions being disposed for meshing engagement with the drive gear and the hiatus portions being disposed between the toothed portions and being arranged such that the wheel is disengaged from the drive gear when the hiatus portions are adjacent to the drive gear; a cam surface associated with the toothed wheel; a link disposed for angular movement and angularly driven by the cam; means for urging the link against the cam, said urging means coupled to said link and said base plate; a locking mechanism which is operative to lock the toothed wheel in a first position whereat one of the hiatus portions is adjacent the drive gear and in a second position whereat the other hiatus portion is adjacent the drive gear, the first toothed portion being effective for rotating the wheel, upon being unlocked, from its second position to its first position by the drive gear and motor; the cam surface, link and urging means cooperating to rotate the wheel from its first position and toward its second position, the hiatus portions associated with the first position extending beyond the first position and a majority of the distance to the second position such that the toothed wheel freely rotates during this distance upon being unlocked, the second toothed portion providing means for stopping the free rotation of the toothed wheel and reengaging the toothed wheel such that it is driven to the second position under the power of the motor, whereby the operation of said locking mechanism permits said toothed wheel to rotate between its locked positions thereby angularly moving said link so as to reciprocate said base plate on said chassis.

2. A controllable drive assembly for a tape recorder including a reel mount assembly for rotating a reel of tape during playback operations, a movable lever, an idler wheel disposed on said movable lever for engaging and disengaging the reel mount assembly and means for driving the idler wheel, said drive assembly comprising: a drive gear; a motor for driving the drive gear; a toothed wheel which is mounted for rotation and including a first and second toothed portion and a first and second hiatus portion, the toothed portions being disposed for meshing engagement with the drive gear and the hiatus portions being disposed between the toothed portions and being arranged such that the wheel is disengaged from the drive gear when the hiatus portions are adjacent to the drive gear; a cam surface associated with the toothed wheel; a link disposed for angular movement and angularly driven by the cam; means coupling said link to said lever, means for urging the link against the cam; a locking mechanism which is operative to lock the toothed wheel in a first position whereat one of the hiatus portions is adjacent the drive gear and in a second position whereat the other hiatus portion is adjacent the drive gear, the first toothed portion being effective for rotating the wheel, upon being unlocked, from its second position to its first position by the drive gear and motor; the cam surface, link and urging means cooperating to rotate the wheel from its first position and toward its second position, the hiatus portions associated with the first position extending beyond the first position and a majority of the distance to the second position such that the toothed wheel freely rotates during this distance upon being unlocked, the second toothed portion providing means for stopping the free rotation of the toothed wheel and reengaging the toothed wheel such that it is driven to the second position under the power of the motor, whereby the operation of said locking mechanism permits said toothed wheel to rotate between its locked positions and the links to act against the camming surface so as to bring said idler wheel into and out of engagement with the wheel mount assembly.

3. A controllable drive assembly according to claims 1 or 2 in which the locking mechanism is mounted on the chassis so as to be engageable with and disengageable from the toothed wheel, the locking mechanism including a movable element which locks the toothed wheel when it has rotated to its second position, and an electromagnet which operates the movable element.

4. A controllable drive assembly according to claim 3 in which said link is urged into abutment against the cam surface through a cam follower interposed therebetween so that when the movable element has unlocked the toothed wheel, the pressure applied by the cam follower to the cam surface causes the cam surface and the toothed wheel to rotate slightly to displace the relative position of the toothed wheel with respect to the drive gear, thereby bringing the first toothed portion into meshing engagement with the drive gear.

5. A controllable drive assembly according to claim 3 in which the toothed wheel is formed with a detent such as a step which is engaged by the movable element, thereby locking the toothed wheel.

* * * * *